Patented Oct. 8, 1935

2,016,285

UNITED STATES PATENT OFFICE 2,016,285

MANUFACTURE OF CONDENSATION PRODUCTS

Wilhelm Kraus, Vienna, Austria, assignor, by mesne assignments, to American Cyanamid Company, a corporation of Maine No Drawing. Application March 28, 1930, Serial No. 439,855. In Austria May 11, 1929

3 Claims. (Cl. 260—3)

This invention relates to a process for the manufacture of products of condensation from carbamides, thio-carbamides or their derivatives or mixtures of the said substances and aldehydes, more particularly formaldehyde. All that is said in the following description with reference to urea, applies to all carbamides, thio-carbamides or their derivatives or mixtures of these substances.

The object of the invention is to provide a process for the manufacture of products of condensation which eliminates the hitherto existing drawbacks which appear when less than 2 mols. formaldehyde are used for 1 mol. urea. In order to reduce the formaldehyde to a proportion, less than 2 mols. of formaldehyde to 1 mol. urea, it has heretofore been the practice to add the required amount of urea directly to the solution containing the excess formaldehyde. It has been found however that this method does not give completely satisfactory results as during the further course of the process, by-products are formed which not only cloud the mass but also render it inferior in several respects. These impurities do not show anything like as high a degree of polymerization as the remaining masses. Owing to this, they remain substantially more sensitive to solvents, they swell up with hot water and injure by these bad properties also the hardened colloids where the latter are intended to be used not as transparent masses but for instance as binders for the manufacture of lakes or of molding powders. Unexpectedly it has been found that the formation of these by-products can be prevented by the addition to a solution containing formaldehyde of the urea in an already combined state. It is immaterial if small quantities of the urea are not yet firmly combined. As however the ratio between the two components when using less than 2 mols. formaldehyde to 1 mol. urea is already very near the theoretical one, the utilization of combined urea necessitates also a modification of the process.

The new process consists substantially in first bringing the urea together with formaldehyde in the proportion of less than 1:1.4 molecules at a temperature below 70° C., whereupon by bringing the urea thus preliminarily condensed, together with formaldehyde, the desired ratio between the two components, situated above 1:1.4 and below 1:1.8 molecules, will be obtained, and the solution is then subjected to further treatment in the usual manner.

According to one method of carrying out the process, the urea preliminarily condensed below 70° with formaldehyde in the proportion of less than 1:1.4 molecules is introduced into such condensation solution of urea and formaldehyde as contain at least 2 mols. formaldehyde to 1 mol. urea.

The process preferably is carried out in such a manner that the urea preliminarily condensed below 70° in the proportion of less than 1:1.4 molecules is allowed gradually to flow into the acid formaldehyde solution or into the acid condensation solution containing free formaldehyde, which contains at least 2 mols. formaldehyde to 1 mol. urea. But it is possible also to start from completely condensed compounds of urea.

In the following examples all proportions are by weight.

*Example 1.*—1000 parts of 30% formaldehyde and 600 parts urea are left to stand for about an hour in neutral or alkaline solution at temperatures below 70° C. This solution is then introduced into 700 parts of boiling acidified formaldehyde (of 30%). After its introduction, the boiling of the condensation solution is continued until the reaction is finished, whereupon distillation is neutrally carried out to a syrup consistency, and the mass is poured into moulds, either neutral or acidified, in the known manner, and caused to set at increased temperatures.

*Example 2.*—A solution is prepared by bringing together 500 parts of 30% formaldehyde and 300 parts urea at a temperature below 70° C. and allowed to flow in about ½ hour into 350 parts of boiling acid formaldehyde (acidified with 5 parts of 10% acetic acid). The boiling is then continued for some time until the reaction between the urea and formaldehyde is finished; 30 parts thio-urea are added, slight neutral condensation is effected, and this solution is mixed with filling materials such as cellulose, wood meal, mineral earths etc. whereupon the mixture is dried if desired in a vacuum at low temperatures. In that way an excellent molding powder is obtained.

*Example 3.*—A dimethylol urea solution prepared from 255 parts urea, 850 parts of 30% formaldehyde, if desired with the assistance of alkali (1.75 parts of 10% soda lye) is heated to boiling and acidified with 8 parts of 10% acetic acid, a strongly exothermic reaction taking place. The boiling is continued for a short time until the reaction is finished, and a monomethylol urea solution is allowed to flow in within ½ hour, which has been prepared from 105 parts urea and 175 parts of 30% formaldehyde at ordinary temperature. The boiling of the condensation solution is then continued until the reaction is finished. The solution is thereupon distilled in a neutral medium to a syrup consistency, poured in the well known manner in a neutral or acid manner into moulds and left to harden or set at an increased temperature. The final ratio between the urea and formaldehyde will amount in this case to 1:1.7 molecules.

*Example 4.*—A condensation solution prepared at ordinary temperature from 510 parts urea, 1700 parts formaldehyde (of 30%) eventually with the assistance of alkali (3.5 parts of soda lye of 10%) is heated to boiling and acidified with 12 parts of 10% acetic acid. After the completion of the strongly exothermic reaction, a condensation solution prepared from 350 parts formaldehyde and 210 parts urea, if desired with the assistance of 0.7 parts of 10% soda lye at a temperature below 70° C., is allowed to flow in within ½ hour, the boiling is continued until the reaction is finished and 72 parts of thio-urea are added. The mass is then concentrated in a neutral medium, mixed with filling materials and converted in the known manner to press powders.

*Example 5.*—60 parts urea are dissolved in 300 parts of 30% formaldehyde which contain one part of 10% acetic acid, at the ordinary temperature and heated to boiling. Into the boiling solution, within half an hour a solution is allowed to flow prepared at a temperature below 60° C. of 108 parts urea in 150 parts of formaldehyde (in a neutral or alkaline medium) and the boiling is continued until the reaction is finished. The further treatment takes place in the same way as hereinbefore stated.

*Example 6.*—60 parts urea are dissolved in 347 parts of 30% formaldehyde in the presence of 1 part of 10% acetic acid and heated to boiling, then a solution of 89 parts urea in 89 parts of 30% formaldehyde is introduced within half an hour, whereupon the heating of the condensation solution is continued until the reaction is finished. The further treatment is effected in the same way as hereinbefore stated.

*Example 7.*—A dimethylol solution prepared at an ordinary temperature from 255 parts urea and 850 parts of 30% formaldehyde, if desired with the assistance of 175 parts of 10% soda lye, is heated to boiling, acidified with 14 parts of 10% formic acid and maintained boiling for half an hour. It is then allowed to cool, and the acid cooled solution is mixed with a monomethylol solution which had been prepared at an ordinary temperature from 105 parts urea and 175 parts formaldehyde. The mixture of these two solutions is then allowed to stand until the reaction is finished, whereupon the mass is distilled and treated in the usual manner.

I claim:
1. A process for the manufacture of products of condensation from substances selected from a group consisting of urea and thiourea which comprises preliminarily reacting the selected substance with formaldehyde in aqueous solution, the ratio thereof being not over 1 to 1.4 mols. and at a temperature not over 70° C., and gradually admixing the solution of the preliminary condensate thus obtained with an aqueous formaldehyde solution until the ratio of the selected substance to formaldehyde is greater than 1 to 1.4, but not over 1 to 1.8 mols., and heating to complete the reaction.

2. A process for the manufacture of products of condensation from substances selected from a group consisting of urea and thiourea which comprises preliminarily reacting the selected substance with formaldehyde in aqueous solution, the ratio thereof being not over 1:1.4 mols. and at a temperature not over 70° C., and admixing the solution of the reaction product with an aqueous solution of the selected substance and formaldehyde containing at least 1 mol. of the former to 2 mols. of the latter until the ratio of the selected substance to formaldehyde of the combined solutions is greater than 1 to 1.4, but not over 1 to 1.8 mols., and heating to complete the reaction.

3. A process for the manufacture of clear, faultless, water-resistant condensation products of formaldehyde and a material selected from a group consisting of urea and thiourea which comprises admixing 1 mol. of the selected material with not over 1.4 mols. of formaldehyde in aqueous solution, reacting the admixture at a temperature not over 70° C. to produce a preliminary condensation product, and admixing the solution of the preliminary product with an aqueous solution relatively rich in reactive formaldehyde so that the combined mixture contains from 1.4 to 1.8 mols. of formaldehyde for each mol. of the selected material present.

WILHELM KRAUS.